United States Patent
Kimura et al.

(10) Patent No.: US 8,398,043 B2
(45) Date of Patent: Mar. 19, 2013

(54) SEAT SLIDING DEVICE

(75) Inventors: Gakuji Kimura, Inuyama (JP); Yuusuke Satou, Inuyama (JP); Kensuke Miyoshi, Inuyama (JP)

(73) Assignee: Kabushiki Kaisha Imasen Denki Seisakusho, Inuyama-shi (Aichi) (JP)

( * ) Notice: Subject to any disclaimer, the term of this patent is extended or adjusted under 35 U.S.C. 154(b) by 0 days.

(21) Appl. No.: 12/992,823

(22) PCT Filed: May 11, 2009

(86) PCT No.: PCT/JP2009/058757
§ 371 (c)(1),
(2), (4) Date: Jan. 24, 2011

(87) PCT Pub. No.: WO2009/139348
PCT Pub. Date: Nov. 19, 2009

(65) Prior Publication Data
US 2011/0163217 A1  Jul. 7, 2011

(30) Foreign Application Priority Data

May 16, 2008 (JP) .................................. 2008-129061

(51) Int. Cl.
*F16M 13/00* (2006.01)
*A47C 1/00* (2006.01)

(52) U.S. Cl. ................................... 248/424; 297/344.13

(58) Field of Classification Search ................... 248/424, 248/429, 419, 422; 297/344.1, 344.13, 344.14, 297/344.11; 296/65.13, 65.14, 65.09
See application file for complete search history.

(56) References Cited

U.S. PATENT DOCUMENTS

2008/0048476 A1* 2/2008 Kojima et al. ................ 297/341

FOREIGN PATENT DOCUMENTS

| CN | 101130346 A | 2/2008 |
|---|---|---|
| JP | 54-041471 | 4/1979 |
| JP | 2002154356 | 5/2002 |
| JP | 2004-148854 A | 5/2004 |
| JP | 2007223499 | 9/2007 |
| JP | 2008024110 | 2/2008 |
| JP | 2008056104 | 3/2008 |
| JP | 2008074380 A | 4/2008 |

* cited by examiner

*Primary Examiner* — Jonathan Liu
*Assistant Examiner* — Erin W Smith
(74) *Attorney, Agent, or Firm* — Lucas & Mercanti, LLP (57) ABSTRACT

A seat sliding device for preventing accidental operation of the operation member. The lock member 50 fixes (locks) the upper rail 20 fixed to a vehicle seat and the lower rail 30 fixed to the vehicle floor via the front and rear feet so as not to make a relative movement. The lock member 50, with the lock nails 55 of the pivoting member 50b, pivots around the pivot center L extending in the rail sliding direction, in response to the operation of the operation lever, and the pivot center L is positioned distant from the lock nails 55.

2 Claims, 11 Drawing Sheets

SEAT SLIDING DEVICE

This is a U.S. National Phase Application under 35 U.S.C. 371 of International Application PCT/JP2009/58757, filed on May 11, 2009. This Application claims the priority of Japanese Application No. 2008-129061, filed May 16, 2008, the entire contents of both Applications are hereby incorporated by reference.

TECHNICAL FIELD

The present invention relates to a seat sliding device for adjusting a seat for a vehicle back and forth.

BACKGROUND ART

Conventionally, as a seat sliding device for a vehicle that is for adjusting a seat for a vehicle back and forth, a seat sliding device for a vehicle disclosed in Patent Document 1 described below is known. In the lock mechanism of this seat sliding device for a vehicle, the nails of the lock lever tiltably fixed to the upper rail engage the engaging holes of the lower rail and the engaging holes of the upper rail and the like, thereby immovably locking the upper rail relative to the lower rail. When the lock lever is tilted by operation of the operation lever and the nails are pulled out from the engaging holes of the lower rail and the engaging holes of the upper rail and the like, the above-mentioned lock state is released.

PRIOR ART DOCUMENT

Patent Document 1: Japanese Patent Application Laid-Open No. 2002-154356

SUMMARY OF THE INVENTION

Problem to be Solved by the Invention

It is assumed that, when a vehicle having passengers collides or brakes suddenly or in a similar case, accidental contact with the operation lever may tilt the operation lever in the unlocking direction, causing an unlocked state of the lock mechanism. Also, it is assumed that, in the event of a collision or a sudden braking as described above, the self-weight of the operation lever may tilt the operation lever in the unlocking direction, resulting in an unlocked state of the lock mechanism. To solve the above problems, the lock mechanism needs to be configured so as to prevent the lock mechanism from being easily released. Therefore, the operation stroke of the operation lever needs to be increased.

In the case where the lock lever is pivoted around the pivot center extending in the rail sliding direction to switch between a locked state and an unlocked state according to tilting of the operation lever by operation of the operation lever, the operation stroke of the operation lever is determined by the moving distance of the part where the operation lever biases the lock lever. Therefore, in order to increase the operation stroke of the operation lever, the tilting center of the operation lever may be moved to the lock lever side to change the ratio of the operation stroke of the operation lever to the moving distance of the biased part of the lock lever.

However, there is a problem that, if the tilting center of the operation lever is separated from its center of gravity as a result of moving the tilting center of the operation lever to the lock lever side, the operation lever may swing easily.

The present invention is made to solve the above-mentioned problems and an object of the invention is to provide a seat sliding device which prevents accidental operation of the operation member.

Means for Solving the Problem

To achieve the above object, the seat sliding device according to claim 1 includes a lower rail member (30) fixed to a vehicle body (B), an upper rail member (20) fixed to a seat (S) and slidably mounted on the lower rail member, a lock member (50) having a locking side engaging part (55) which can engage with or disengage from a lower rail side engaged part (35a) of the lower rail member and upper rail side engaged parts (22a, 23a) of the upper rail member and an operation member (70) which is operated to switch between a locked state in which the locking side engaging part engages the engaging part on the lower rail side and the engaging part on the upper rail side and an unlocked state in which the locked state is released. In the seat sliding device (10), the lock member is technically characterized in that the locking side engaging part pivots around the pivot center (L) extending in the sliding direction, in response to the operation of the operation member, and that the pivot center is located at a position distant from the locking side engaging part.

Effects of the Invention

According to the invention of claim 1, the lock member includes the locking side engaging part which pivots around the pivot center extending in the sliding direction, in response to the operation of the operation member, and the pivot center is located at a position distant from the locking side engaging part.

Thus, the pivot center and the locking side engaging part are separated from each other. Therefore, compared to the case where the pivot center and the locking side engaging part are positioned close to each other, the moving distance of the lock member part which moves in response to the operation of the operation member when releasing the engagement of the locking side engaging part and the lower rail side and upper rail side engaged parts which are in a locked state is increased. As a result, the operation stroke in an unlocking operation can be increased.

Therefore, accidental operation of the operation member can be prevented.

According to the invention of claim 2, the lock member pivots around the pivot center and includes the pivoting member having the locking side engaging part at a position separate from the pivot center, and the operation member biases the part distant from the pivot center of the pivoting member when switching to an unlocked state.

Thus, the operation member biases the part separated from the pivot center of the pivoting member when switching to an unlocked state. Therefore, compared to the case where the part in the vicinity of the pivot center of the pivoting member is biased, the moving distance of the biased part of the pivoting member which moves in response to the operation of the operation member of is increased when releasing a locked state. As a result, the operation stroke in an unlocking operation can be increased. Therefore, accidental operation of the operation member can be reliably prevented.

According to the invention of claim 3, the lock member includes a support member which supports the pivoting member so as to pivot around the pivot center. The pivoting member includes one or a plurality of through holes formed at positions distant from the locking side engaging part. On the support member, support pieces which can be inserted into the through holes and pivot relative to the through holes in an inserted state are formed by the same number as that of through holes.

Thus, when the support pieces formed on the support member corresponding to the through holes are inserted into one or a plurality of through holes formed on the pivoting member, the support pieces can pivot relative to the through holes with the support pieces being inserted into the through holes. As a result, the pivoting member can be pivotably supported to the support member.

Therefore, the pivoting member can be pivotably supported to the support member in a simple configuration.

According to the invention of claim 4, each of the support pieces includes a support portion having a C-shaped cross section, which is inserted into the through hole in a retalively pivotable manner. As a result, the pivoting member is pivotably supported in the through hole by the support portion of the support piece of the support member, the support portion having a C-shaped cross section, and the pivoting member is prevented from coming off from the support member easily.

According to the invention of claim 5, on the pivoting member, one or a plurality of protrusions are formed, which project from the part distant from the locking side engaging part in a direction distant from the locking side engaging part. On the support member, openings through which the protrusions can be inserted when the support pieces are inserted into the through holes and are open slightly wider than the protrusions are formed by the same number as that of protrusions.

Therefore, when the pivoting member pivots around the pivot center, movement of the pivoting member in the sliding direction of the pivoting member is restricted by the openings, thereby preventing the pivoting member from rattling in the sliding direction.

According to the invention of claim 6, the lock member includes a biasing member for locking which biases the pivoting member so that it is kept in a locked state relative to the support member. After assembling the lock member to the upper rail member, both ends of the biasing member which keeps the pivoting member of the lock member in a locked state relative to the upper rail member may be assembled on both of the pivoting member and the upper rail member. In this case, one side end portion of the biasing member needs to be assembled to such a part of the upper rail member that has no effect on sliding motion of the upper rail member and the lower rail member. Such an assembling work is difficult.

When the lock member itself includes a biasing member for locking which biases the pivoting member so that it is kept in a locked state relative to the support member, no such work as engagement of the biasing member to the lock member which is fixed to the upper rail member is required, resulting in improvement in workability for assembling and reduction of the manufacturing cost.

MODE FOR CARRYING OUT THE INVENTION

[First Embodiment]

Figure 1:
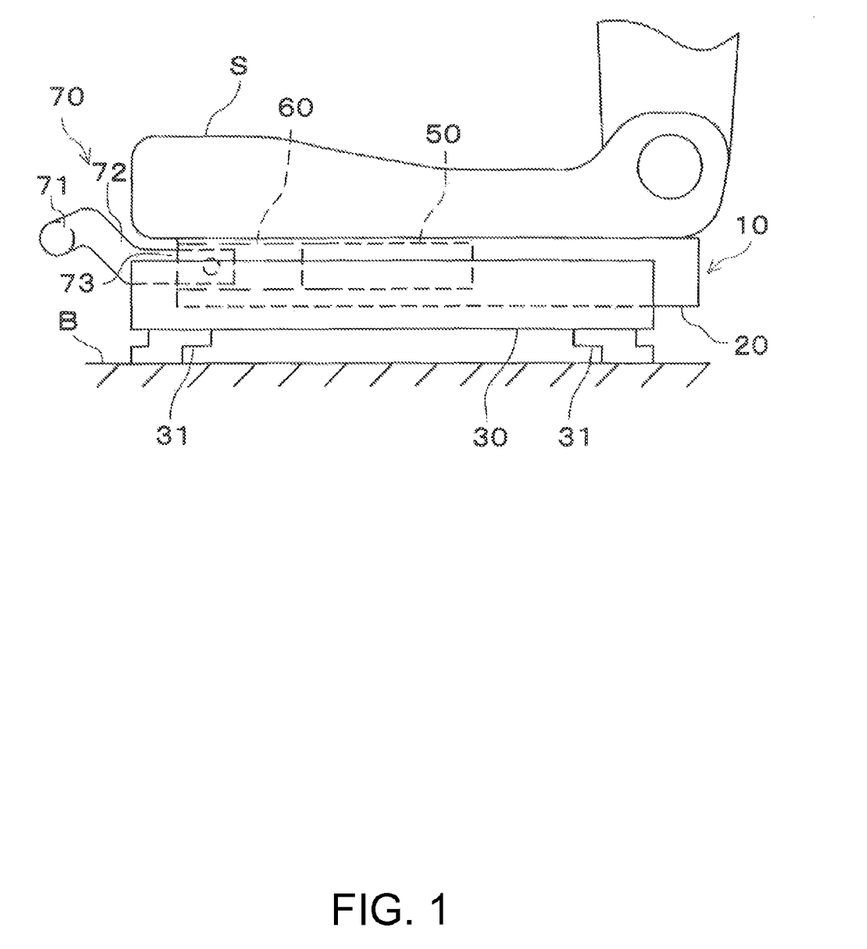
FIG. 1 is a side view showing the configuration outline of a vehicle seat to which a seat sliding device according to a First Embodiment of the present invention is installed.
Figure 2:
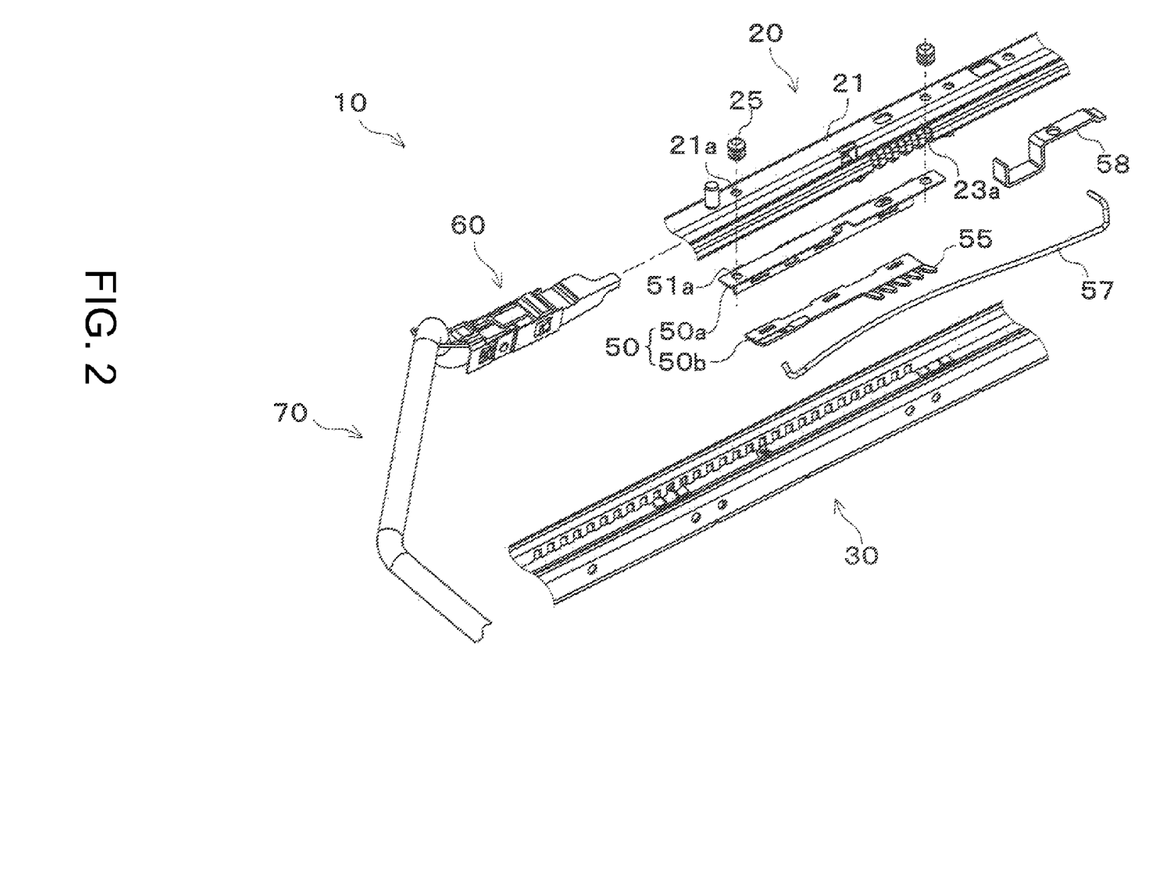
FIG. 2 is a partially exploded perspective view of the seat sliding device shown in FIG. 1.
Figure 3:
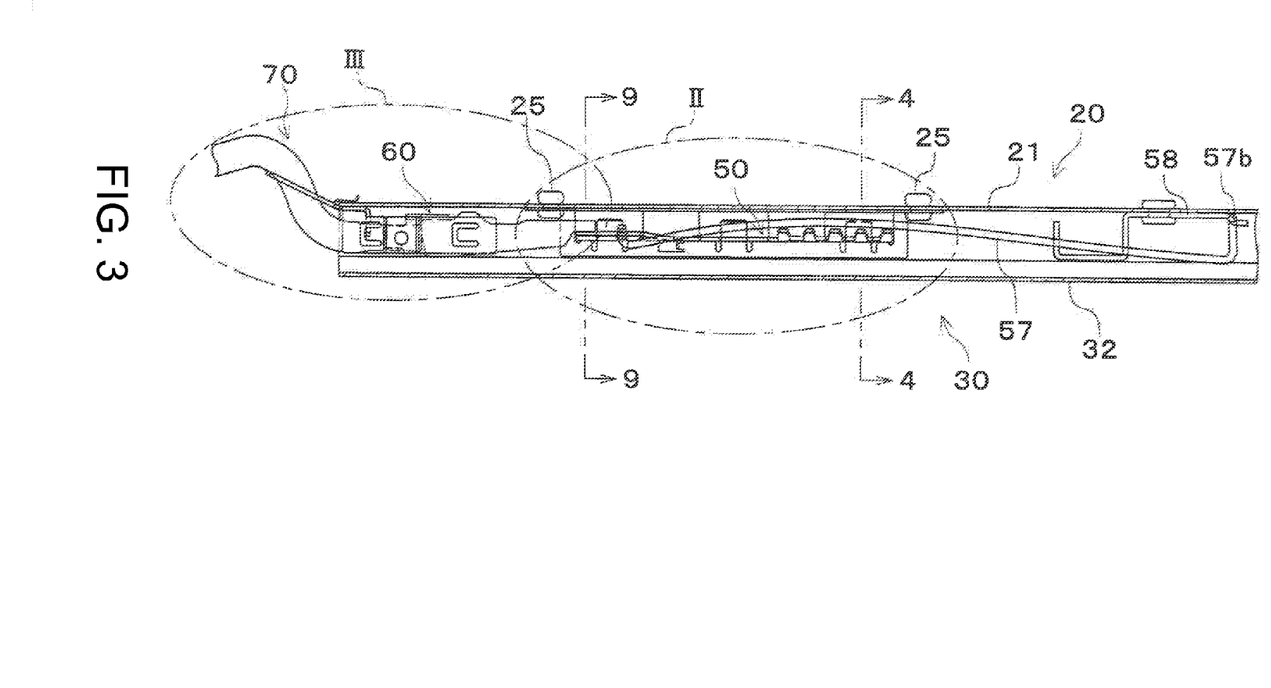
FIG. 3 is a cross-sectional view of the seat sliding device shown in FIG. 1.
Figure 4:
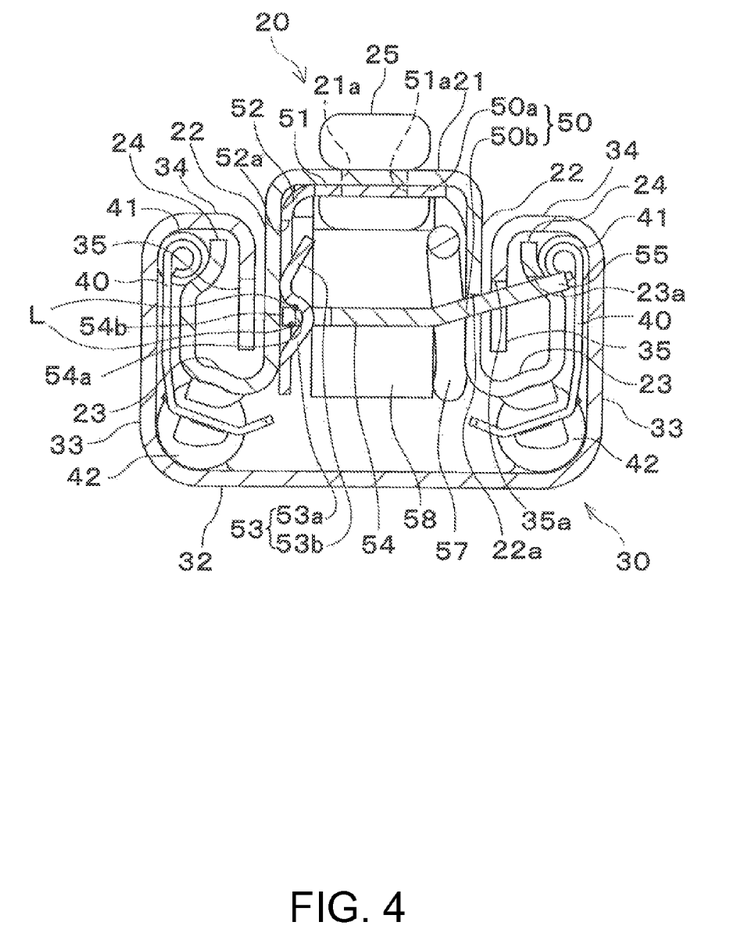
FIG. 4 is a cross-sectional view taken along the line 4-4 of FIG. 3.

Hereinafter, a First Embodiment of the present invention will be described with reference to the accompanying drawings. FIG. 1 is a side view showing the configuration outline of a vehicle seat S to which a seat sliding device 10 according to a First Embodiment of the present invention is installed. FIG. 2 is a partially exploded perspective view of the seat sliding device 10 shown in FIG. 1. FIG. 3 is a partially cross-sectional view of the seat sliding device 10 shown in FIG. 1. FIG. 4 is a cross-sectional view taken along the line 4-4 of FIG. 3.

As shown in FIGS. 1 to 3, the seat sliding device 10, in which the vehicle seat S is fixed to a vehicle floor B so that it can slide back and forth, mainly includes a pair of upper rails 20 fixed to the vehicle seat S, a pair of lower rails 30 fixed to the vehicle floor B via front and rear feet 31, a pair of lock members 50 which can be fixed (locked) so as not to allow a relative movement of the upper rails 20 and the lower rails 30, a pair of biasing members 60 which can bias the lock members 50 in the pivoting direction to unlock the lock members 50 in response to the operation of an operation lever 70 (only each one is shown in FIG. 1 and FIG. 2) and the operation lever 70 which is operated to switch between a locked state in which the upper rails 20 and the lower rails 30 are engaged by the pair of lock members and an unlocked state in which the locked state is released.

As shown in FIG. 4, the upper rail 20 includes a top wall 21 which is generally horizontal to the vehicle floor B and to which the vehicle seat S is mounted via a bracket or the like (not shown), side walls 22 vertically attached from both ends of the top wall 21, connecting portions 23 which upwardly bend from the lower end of each of the side walls 22, and tilted portions 24 which hold first steel balls 41 of retainers 40 in spaces formed between the tilted portions and the lower rail 30.

Notches 22a, 23a which engage with lock nails 55 (described later) of the lock member 50 are provided at five points each on one side wall 22 and the connecting portion 23 connecting to the side wall 22, respectively.

The lower rail 30 includes a bottom wall 32 which is generally horizontal to the vehicle floor B, faces the top wall 21 of the upper rail 20 and is fixed to the vehicle floor B via front and rear feet 31, first side portions 33 upwardly extending from both ends of the bottom wall 32, collar portions 34 each of which extends from the upper end of each first side portion 33 toward the center in generally parallel with the bottom wall 32, and second side portions 35 each of which extends from the end of each collar portion 34 toward the bottom wall 32 in generally parallel with the first side portions 33.

On the second side portions 35 corresponding to the notches 22a of the side walls 22 and the notches 23a of the connecting portions 23, notches 35a formed in the same manner as the notches 22a, 23a are provided at five or more points.

The upper rail 20 is positioned so that the top wall 21 thereof faces the bottom wall 32 of the lower rail 30 and tilted portions 24 of the upper rail 20 get into each of the spaces formed between the first side portions 33 and the second side portions of the lower rail 30. First steel balls 41 of the retainers 40 are positioned between the corner portions, which are between the first side portions 33 and the collar portions 34 of the lower rail 30, and the tilted portions 24 of the upper rail 20. Second steel balls 42 of the retainers 40 are positioned between the corner portions, which are between the bottom wall 32 and the first side portions 33 of the lower rail 30, and the connecting portions 23 of the upper rail. The first steel balls 41 and the second steel balls 42 which are held by the retainers 40 allow the upper rail 20 and the lower rail 30 to smoothly slide in the frontward and backward directions of the vehicle.

Figure 5:
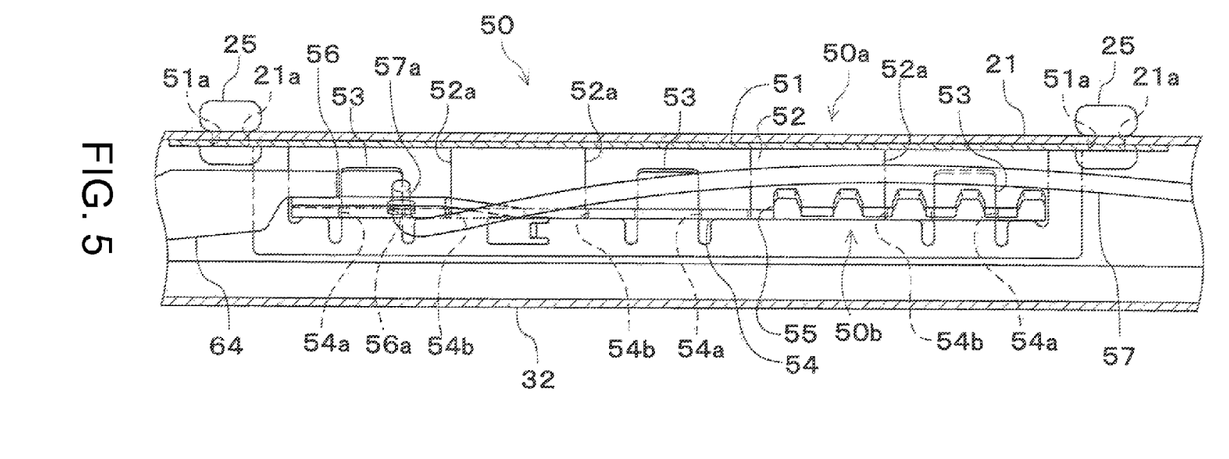
FIG. 5 is an enlarged view of the section within the ellipse II drawn by alternate long and short dashed lines shown in FIG. 3.
Figure 6:
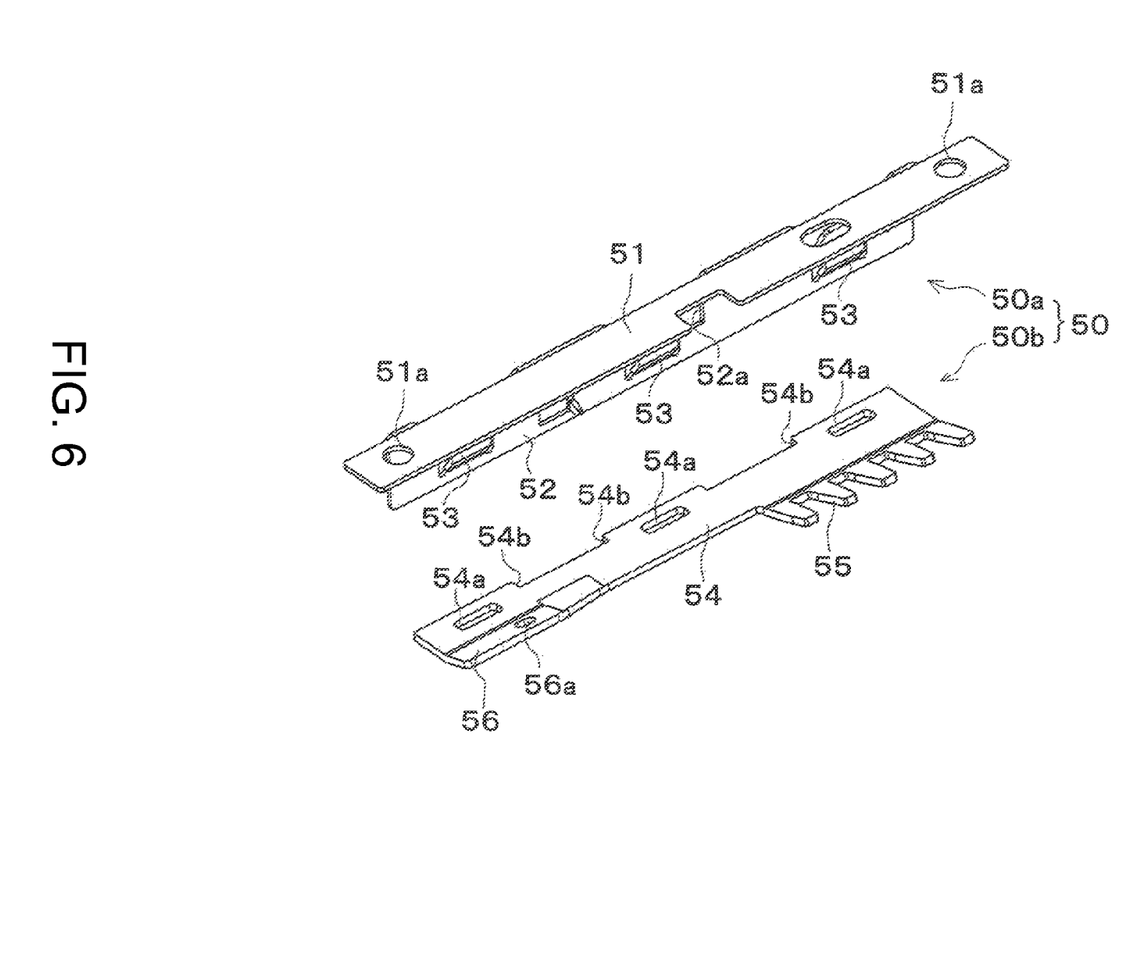
FIG. 6 is an exploded perspective view of the lock member shown in FIG. 5.

FIG. 5 is an enlarged view of the section within the ellipse II drawn by alternate long and short dashed lines shown in FIG. 3. FIG. 6 is an exploded perspective view of a lock member 50 shown in FIG. 5.

As shown in FIG. 5 and FIG. 6, the lock member 50 includes a lock bracket 50a and a pivoting member 50b. The lock bracket 50a is formed by a top board 51 provided with two circular holes 51a in the vicinity of both ends in the longitudinal direction and a side board 52 extending downward from one side end portion of the top board 51 and includes a generally L-shaped cross section.

The side board 52 includes three support pieces 53 arranged at substantially equal intervals in the longitudinal direction. Each of the support pieces 53 includes a support portion 53a which has a substantially C-shaped cross section (substantially inverted C-shaped cross section as seen from the direction facing the paper of FIG. 4) and is connected to the side board 52 at the lower end thereof and an extending portion 53b which extends from the upper end of the support portion 53a toward the upward slanting direction (see FIG. 4). In the upper vicinity of the side board 52 to which each of the support portions 53a is connected, an opening 52a which is wide open in the longitudinal direction is formed (see FIG. 5).

As shown in FIG. 6, the pivoting member 50b includes a plate-like body 54 and five lock nails 55 formed so as to project from the portion of one side in the longitudinal direction (counter operation lever side) of the plate-like body 54 to the crosswise and upward slanting direction. On the plate-like body 54, three elongated holes 54a which are wide open in the longitudinal direction are provided with spacings on the opposite side of the crosswise direction of the lock nails 55 over the whole length in the longitudinal direction. Into each of the elongated holes 54a, the extending portion 53b and the support portion 53a of the corresponding support piece 53 can be inserted. The elongated hole 54a is formed so that the width in the breadth direction is larger than the thickness of the support portion 53 so as to allow the support piece 53 in an inserted state to make a relative pivoting.

On the plate-like body 54, protrusions 54b projecting anglewise in the direction distant from the lock nails 55 are provided in the vicinity of the respective elongated holes 54a. The width (dimension in the rail sliding direction) of each protrusion 54b is slightly smaller than that of each opening 52a of the side board 52 (see FIG. 5).

The side distant from the elongated hole 54a (lock nail side) on the other side (operation lever side) portion in the longitudinal direction of the plate-like body 54 is formed as a tilted portion 56 which is inclined upward. On the tilted portion 56, a through hole 56a is formed, in which one side end portion 57a of a lock spring 57 described later can be inserted.

As shown in FIG. 4, the pivoting member 50b configured as described above is engaged by inserting the support pieces 53 into the corresponding elongated holes 54a and thereby pivotably supporting to a lock bracket 50a around the contact portion of the lower end of each protrusion 54b and the lower edge of each opening 52a or the contact portion of the upper edge of each elongated hole 54a and each support portion 53a which serves as a pivot center L. The pivot center L extends in the rail sliding direction. Therefore, in FIG. 4, the pivot center L is shown with dots because it extends in the direction perpendicular to the paper plane.

Each protrusion 54b of the pivoting member 50b is formed so that the width dimension thereof is slightly smaller than that of the corresponding opening 52a. Therefore, even in the case where the pivoting member 50b pivots around the pivot center L, the pivoting member 50b does not rattle in the longitudinal direction (rail sliding direction) (see FIG. 5). Further, at each elongated hole 54a, the pivoting member 50b is pivotably supported to the support portions 53a of the support pieces 53 of the lock bracket 50a, each support portion having a generally C-shaped cross section, thereby preventing the pivoting member 50b from coming off from the lock bracket 50a easily.

The lock member 50 configured as mentioned above is fixed to the upper rail 20 by crimping both the circular holes 51a of the top board 51 and the two circular holes 21a provided on the top wall 21 using a rivet 25, with the top board 51 and the side board 52 of the lock bracket 50a being in contact with the top wall 21 and the side board 22 of the upper rail 20. Into the through holes 56a of the pivoting member 50b, one side end portion 57a of the lock spring 57 formed by bending a metal bar which is an elastic body is inserted.

Therefore, the pivoting member 50b is biased by the lock spring 57 inserted to one side end portion 57a, in such a direction as to pivot around the pivot center L in the counterclockwise in FIG. 4, that is, in the direction where the lock nails 55 engage with the notches 22a, 23a of the upper rail 20 and the corresponding notches 35a of the lower rail 30 (lock pivoting direction). The lock spring 57 is fixed to the upper rail 20 at the other side end portion 57b by a fixture 58 formed by bending a flat plate.

Figure 7:
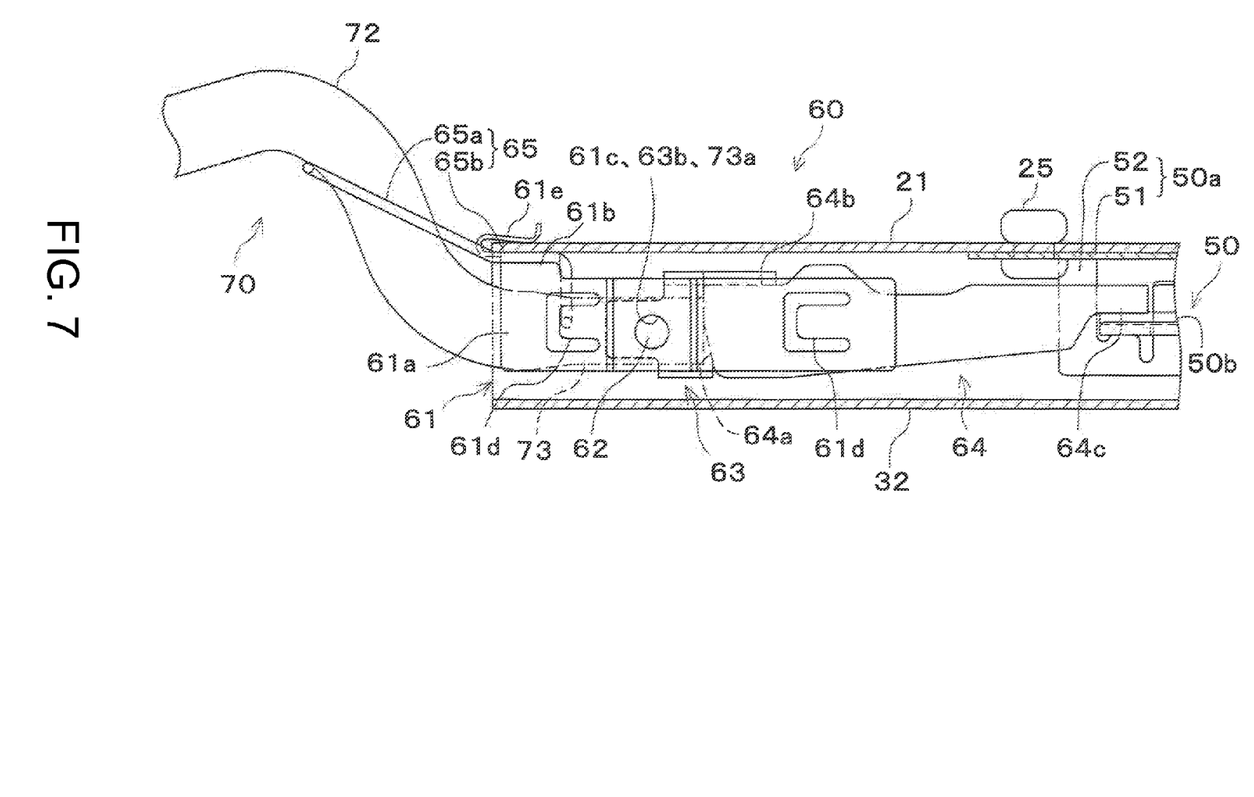
FIG. 7 is an enlarged view of the section of within the ellipse III drawn by alternate long and short dashed lines shown in FIG. 3.
Figure 8:
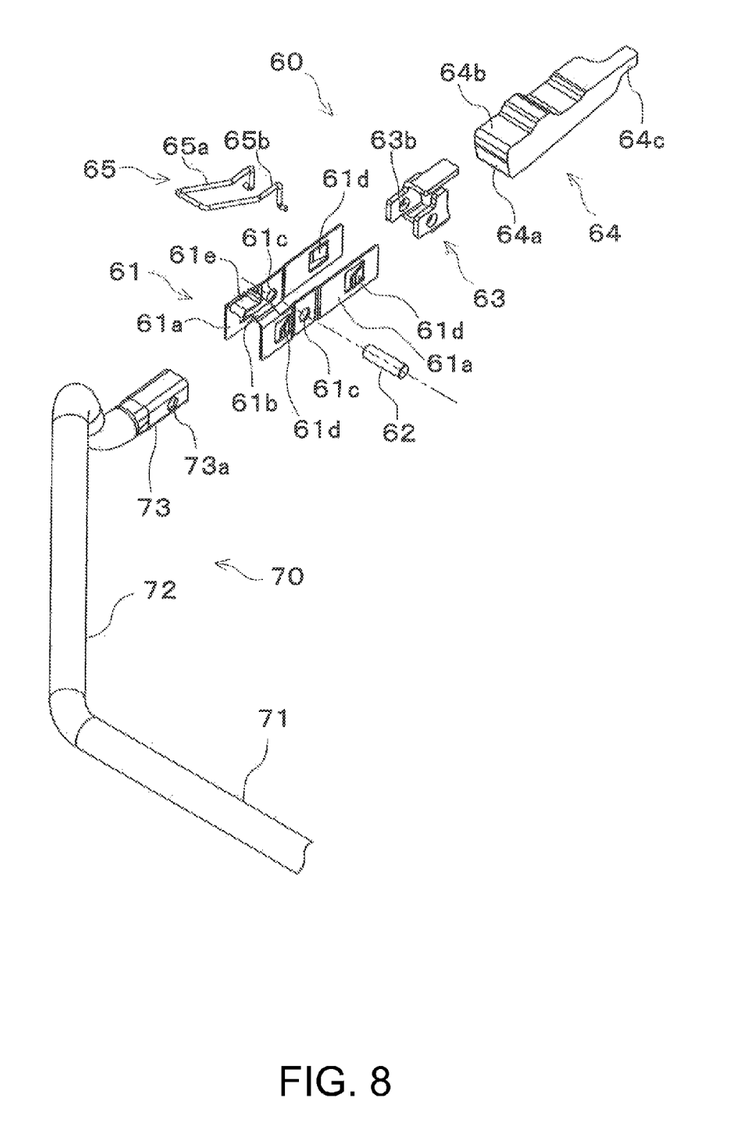
FIG. 8 is an exploded perspective view of the biasing member shown in FIG. 7.

FIG. 7 is an enlarged view of the section within the ellipse II drawn by alternate long and short dashed lines shown in FIG. 3. FIG. 8 is an exploded perspective view of the biasing member 60 shown in FIG. 7.

As shown in FIG. 7 and FIG. 8, the biasing member 60 includes a connecting body support member 61 fixed to the upper rail 20, a shaft 62 which is press-fitted into both through holes 61c of the connecting body support member 61 and fixed perpendicular to the rail sliding direction, a connecting body bracket 63 tiltably supported to the shaft 62 at the both through holes 63b, a connecting body 64 fixed to the connecting body bracket 63, and a generally clip-like elastic member 65 which prevents tilting in the direction opposite to the unlocking tilting direction (counter unlocking tilting direction) for unlocking a connecting portion 72 of the operation lever 70.

The connecting body support member 61 is formed by connecting the upper end of the operation lever side of both side boards 61a to the connecting portion 61b. On the both side boards 61a, through holes 61c are formed on the respective center parts. Notch pieces 61d are formed on both the operation lever side and the counter operation lever side of the through holes 61c. The notch pieces 61d are formed so as to prevent a relative movement of the connecting body support member 61 to the operation lever side against both side walls 22 when the notch pieces engage the engaging part (not shown) provided on the operation lever side on both side walls 22 of the upper rail 20.

On the connecting portion 61*b*, an elastic holding portion 61*e* having a substantially U-shaped cross section, which is open on the counter operation lever side. The height of the U-shaped cross section portion of the elastic holding portion 61*e* is slightly smaller than the thickness of the top wall 21 of the upper rail 20.

The connecting body 64 is fixed to the connecting body bracket 63 at an end face 64*a* of the operation lever side and a top face 64*b* thereof by welding, etc. On one part of the counter operation lever side of the connecting body 64, a connecting piece 64*c* which can be brought into contact with the tilted portion 56 of the lock member 50 is projected (see FIG. 7).

The operation lever 70 includes a gripper 71 located outward of the upper rail 20, connecting portions 72 extending in parallel and in a substantially downcurved shape from the both ends of the gripper 71, and a support portion 73 which is connected to both connecting portions 72 and includes through holes 73*a* through which the shaft 62 can be inserted (see FIG. 1 and FIG. 8).

Assembly of the biasing member 60 and the operation lever 70, which are configured as mentioned above, to the upper rail 20 will be described below. First, while the shaft 62 is inserted into both through holes 63*b* of the connecting body bracket 63 to which the connecting body 64 has been fixed and both through holes 73*a* of the support portion 73, the shaft 62 is press-fitted in and fixed to the both through holes 61*c* of the connecting body support member 61. As a result, the connecting body 64 and the operation lever 70 are supported to the connecting body support member 61 with the shaft 62 serving as the tilting center.

Next, as shown in FIG. 7, the U-shaped biasing member 65*a* of the elastic member 65 is latched to the connecting portion 72 of the operation lever 70. Both support portions 65*b* of the elastic member 65 are held between the upper face of the connecting portion 61*b* of the connecting body support member 61 and the lower face of the top wall 21 of the upper rail 20, and the biasing member 60 is inserted in the upper rail 20. An elastic holding portion 61*e* of the connecting portion 61*b* of the connecting body support member 61 is engaged with the top wall 21, and the notch pieces 61*d* of the connecting body support member 61 are engaged with the engaging part of both side walls 22.

Thus, the biasing member 60 and the operation lever 70 are assembled to the upper rail 20. At this time, the connecting portion 72 of the operation lever 70 is biased so that the U-shaped biasing portion 65*a* of the elastic member 65 prevents tilting in the counter unlocking tilting direction (see FIG. 7). The lower face of the connecting piece 64*c* of the connecting body 64 is in contact with the upper face of the tilted portion 56 of the lock member 50 (see FIG. 7).

Figure 9A:
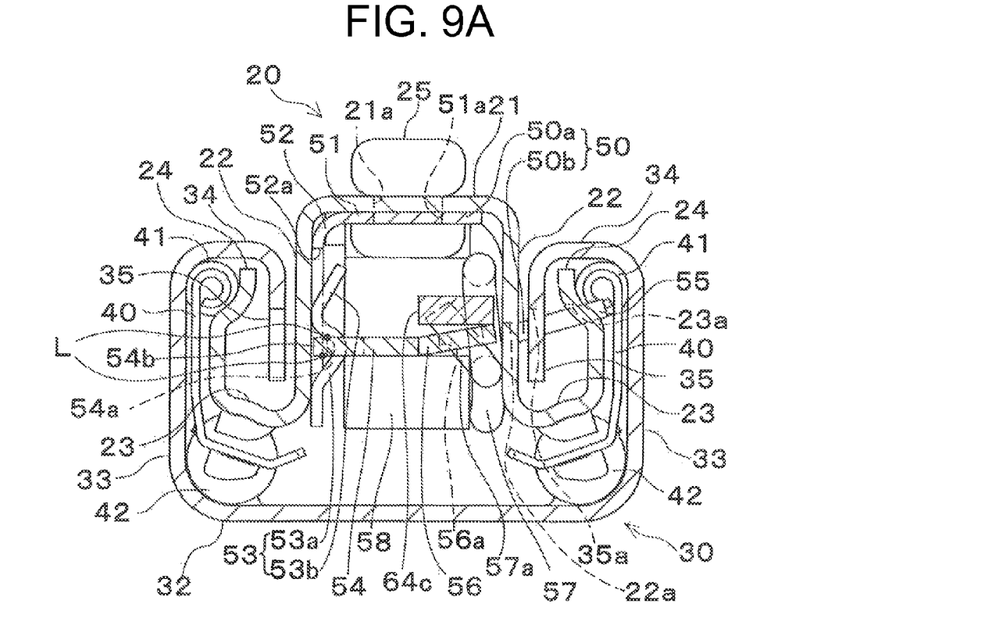
FIG. 9(A) is a cross-sectional view showing a locked state by the lock member, taken along the line 9-9 shown in FIG. 3.
Figure 9B:
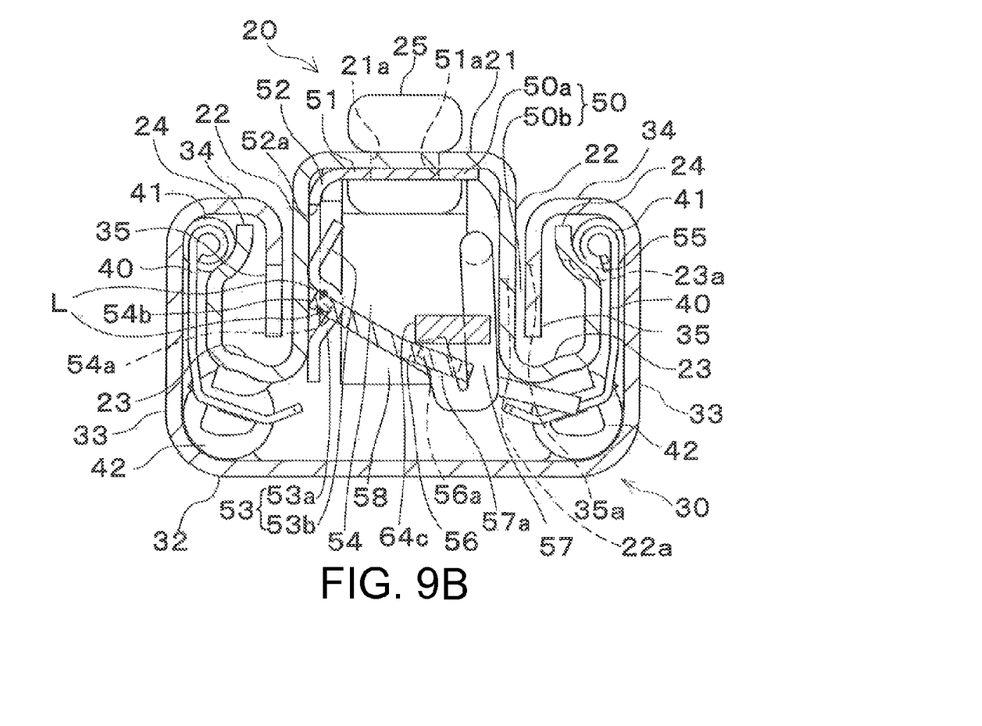
FIG. 9(B) is a cross-sectional view showing an unlocked state by the lock member.

FIG. 9(A) is a cross-sectional view taken along the line 9-9 shown in FIG. 3, showing a locked state by the lock member 50; and FIG. 9(B) is a cross-sectional view showing an unlocked state by the lock member 50.

In the seat sliding device 10 configured as mentioned above, when the gripper 71 of the operation lever 70 is not operated, the lock member 50 is biased around the pivot center L in the lock pivoting direction by the biasing force of the lock spring 57 and the lock nails 55 are kept engaged with the five notches among notches 22*a*, 23*a* of the upper rail 20 and the notches 35*a* of the lower rail 30.

As a result, the upper rail 20 and the lower rail 30 are locked so as not to make a relative movement (see FIG. 9(A)).

In such a locked state by the lock member 50, when the gripper 71 of the operation lever 70 is operated to move upward, the support portion 73 of the operation lever 70 tilts around the shaft 62. When the connecting body bracket 63 is pressed downward by tilting of the support portion 73, the connecting body bracket 63 tilts around the shaft 62 in the downward moving direction of the counter operation lever side (unlocking tilting direction).

When the tilted portion 56 of the lock member 50 is biased downward by the connecting piece 64*c* of the connecting body 64 fixed to the tilting connecting body bracket 63 which tilts as described above, the pivoting member 50*b* tilts around the pivot center L in a clockwise direction (unlocking pivoting direction) in FIG. 9(B). As a result, the engagement of lock nails 55, notches 22*a*, 23*a* of the upper rail 20 and notches 35*a* of the lower rail 30 is released to put the upper rail 20 and the lower rail 30 in an unlocked state where they can make a relative movement.

At this time, On the pivoting member 50*b*, the elongated holes 54*a* and the lock nails 55 which constitute the pivot center L are formed so that they are spaced from each other. Therefore, compared to the case where the elongated holes 54*a* and the lock nails 55 are positioned close to each other, the downward moving distance of the tilted portion 56 of the pivoting member 50*b* which moves in response to the operation of the operation lever 70 becomes larger.

The tilted portion 56 formed distant from the elongated holes 54*a* is biased to the connecting piece 64*c* of the connecting body 64, whereby the pivoting member 50*b* pivots around the pivot center L from a locked state (FIG. 9(A)) to an unlocked state (FIG. 9(B)). Therefore, compared to the case where the part in the vicinity of the elongated hole 54*a* is biased, the downward moving distance of the tilted portion 56 of the pivoting member 50*b* which moves in response to the operation of the operation lever 70 is increased.

Thus, the downward moving distance of the tilted portion 56 of the pivoting member 50*b* is increased, thereby increasing the inclined angle of the connecting body 64 which tilts around the shaft 62 in an unlocked state. As a result, the tilting angle of the support portion 73 which tilts around the shaft 62 in an unlocked state, that is, the upward moving distance of the gripper 71 is increased, and a large operation stroke is required for an unlocking operation.

When the gripper 71 of the operation lever 70 is moved back to its original position after the relative position of the upper rail 20 and the lower rail 30 is adjusted, the biasing against the pivoting member 50*b* by the connecting piece 64*c* of the connecting body 64 is released and the pivoting member 50*b* pivots around the pivot center L in the lock pivoting direction by the biasing force of the lock spring 57. The lock nails 55 engage with five notches among the notches 22*a*, 23*a* of the upper rail 20 and the notches 35*a* of the lower rail 30, and the upper rail 20 and lower rail 30 are locked again so as not to make a relative movement (see FIG. 9(A)).

As described above, in the seat sliding device 10 according to the First Embodiment, the lock member 50 is provided at a position where the lock nails 55 of the pivoting member 50*b* of the lock member 50 pivot around the pivot center L extending in the rail sliding direction in response to the operation of the operation lever 70 and the pivot center L is positioned distant from the lock nails 55.

Since the pivot center L and the lock nails 55 are thus spaced, compared to the case where the pivot center L and the lock nails 55 are positioned close to each other, the downward moving distance of the tilted portion 56 of the lock member 50 which moves in response to the tilting motion of the connecting body 64 by operation of the operation lever 70 becomes larger. As a result, the operation stroke in an unlocking operation can be increased.

Therefore, accidental operation of the operation lever 70 can be prevented.

In the seat sliding device 10 according to the First Embodiment, the lock member 50 includes the pivoting member 50b which pivots around the pivot center L and includes the lock nails 55 formed at the position separate from the pivot center L, and the operation lever 70 biases the tilted portion 56 downward when switching to an unlocked state, the tilted portion being distant from the pivot center L of the pivoting member 50b.

Thus, the operation lever 70 biases the tilted portion 56, which is distant from the pivot center L of the pivoting member 50b, downward via the connecting pieces 64c of the connecting body 64 in the biasing member 60 when switching to an unlocked state. Therefore, compared to the case where the vicinity of the elongated holes 54a which is a part in the vicinity of the pivot center L of the pivoting member 50b is biased downward, the downward moving distance of the tilted portion 56 of the pivoting member 50b becomes larger, which moves in response to the operation of the operation lever 70 when the locked state is released. As a result, the operation stroke in an unlocking operation can be increased.

Thus, accidental operation of the operation lever 70 can be reliably prevented.

In addition, in the seat sliding device 10 according to the First Embodiment, the lock member 50 includes a lock bracket 50a which pivotably supports the pivoting member 50b around the pivot center L. The pivoting member 50b includes three elongated holes 54a formed at positions spaced from the lock nails 55. On the lock bracket 50a, the support pieces 53 which can be inserted in the elongated holes 54a and pivot relative to the elongated holes 54a in an inserted state are formed by the same number as that of elongated holes 54a.

Thus, by inserting the support pieces 53 corresponding to the elongated holes 54a formed on the lock bracket 50a into the elongated holes 54a formed on the pivoting member 50b, the support pieces 53 can pivot relative to the elongated holes 54a with the support pieces 53 inserted in the elongated holes 54a. As a result, the pivoting member 50b is pivotably supported to the lock bracket 50a.

Therefore, the pivoting member 50b can be pivotably supported to the lock bracket 50a in a simple configuration.

Further, in the seat sliding device 10 according to the First Embodiment, each support piece 53 includes a support portion 53a having a C-shaped cross section and is inserted in each elongated hole 54a so as to make a relative pivoting at each support portion 53a. The pivoting member 50b is pivotably supported, at each elongated hole 54a, to the support portion 53a of each support piece 53 of the lock bracket 50a, the support portion having a generally C-shaped cross section, thereby preventing the pivoting member 50b from coming off from the lock bracket 50a.

Furthermore, in the seat sliding device 10 according to the First Embodiment, the pivoting member 50b includes three protrusions 54b projecting from the elongated holes 54a, which are spaced from the lock nails 55, in the direction distant from the lock nails 55. On the lock bracket 50a, openings 52a are formed by the same number as that of the protrusions 54b, into which each of the protrusions 54b can be inserted when the support pieces 53 are inserted into the elongated holes 54a and which are open slightly wider than the protrusions 54b in the rail sliding direction.

Therefore, when the pivoting member 50b pivots around the pivot center L, movement of the pivoting member 50b in the rail sliding direction is restricted by the opening 52a, preventing the pivoting member 50b from rattling in the rail sliding direction.

[Second Embodiment]

Figure 10:
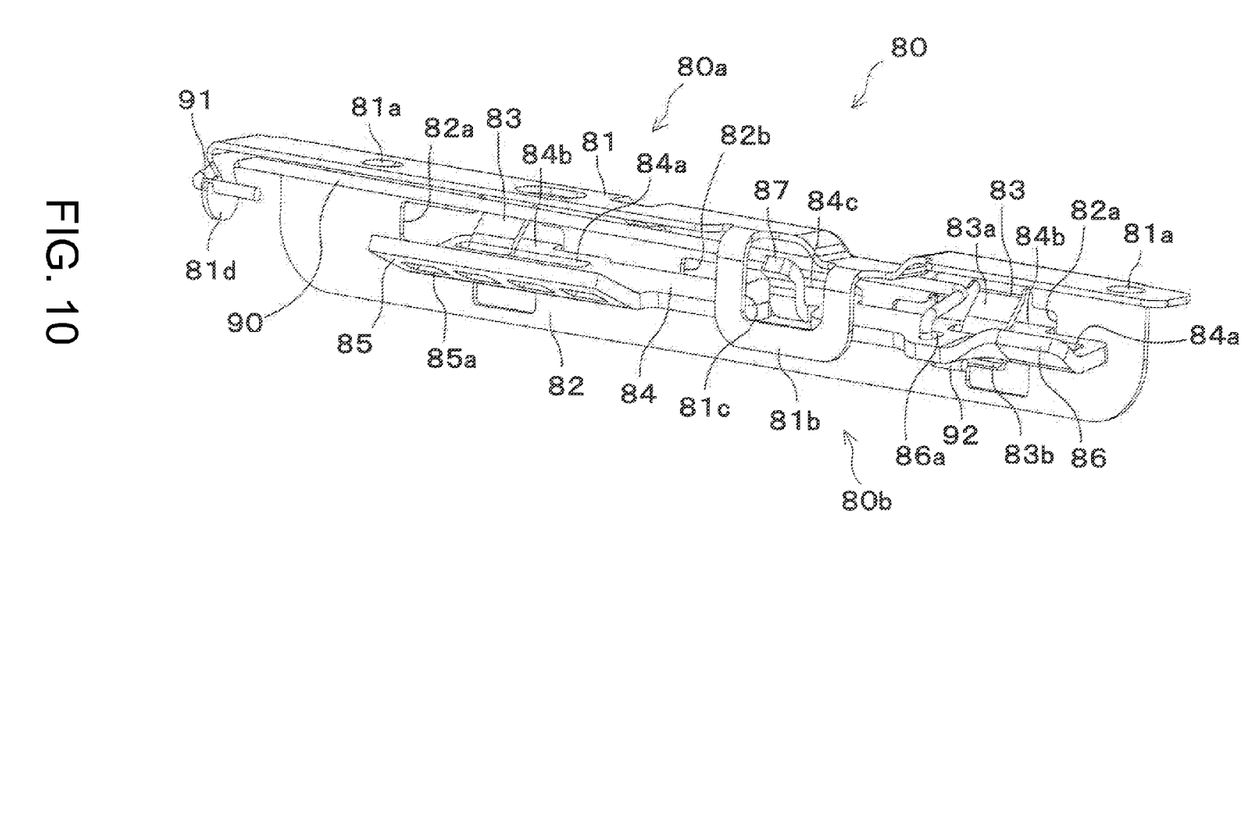
FIG. 10 is a perspective view showing the lock member of the seat sliding device according to a Second Embodiment of the present invention.
Figure 11:
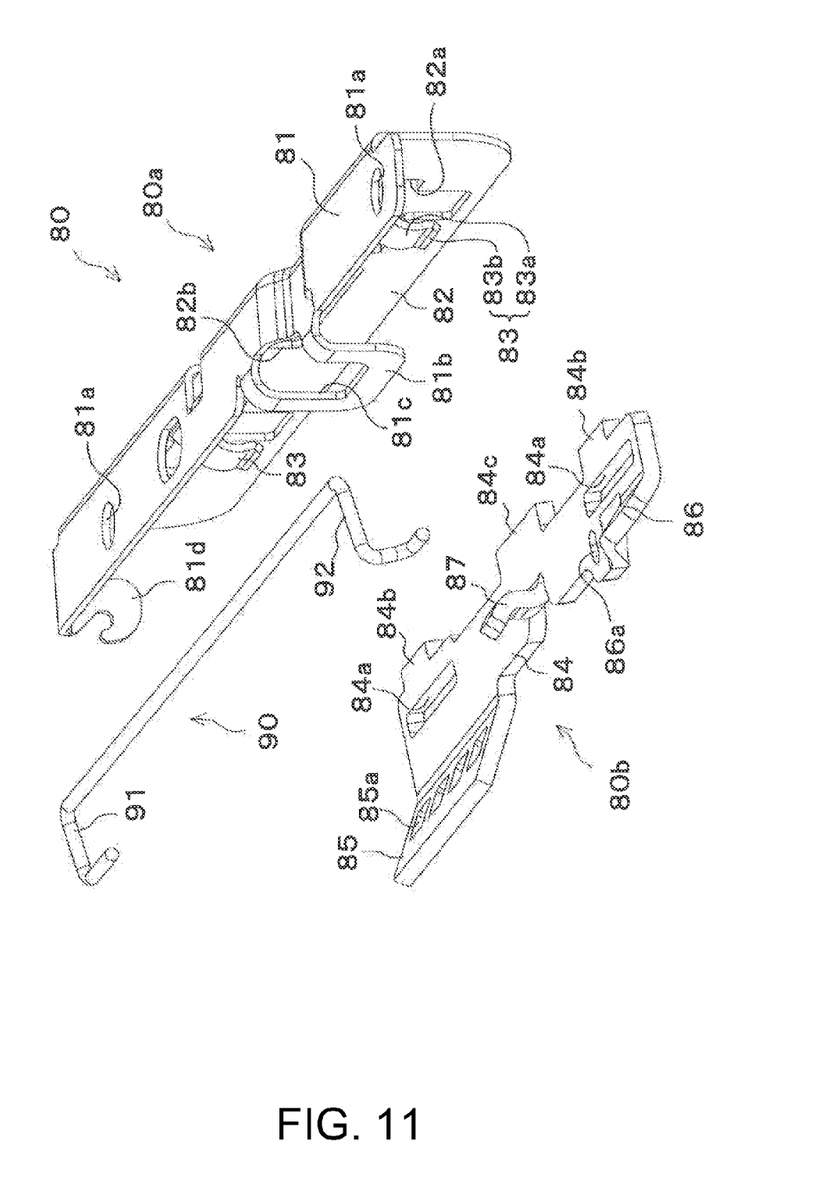
FIG. 11 is an exploded perspective view of the lock member according to the Second Embodiment of the present invention.

Next, the Second Embodiment of the present invention will be described with reference to FIG. 10 and FIG. 11. FIG. 10 is a perspective view showing the a lock member 80 of the seat sliding device 10 according to the Second Embodiment of the present invention. FIG. 11 is an exploded perspective view of the lock member 80 according to the Second Embodiment of the present invention.

The seat sliding device 10 according to the Second Embodiment is different from the seat sliding device according to the First Embodiment in the points that the lock member 80 having a lock spring 90, in place of the lock member 50 described in the above First Embodiment, is adopted and the lock spring 57 is not used. Therefore, to the substantially same components as those of the seat sliding device of the First Embodiment, the same reference numbers are assigned and the explanation thereof is omitted.

As shown in FIG. 10 and FIG. 11, the lock member 80 includes a lock bracket 80a, a pivoting member 80b and a lock spring 90 formed by bending a metal bar which is an elastic body. The lock bracket 80a is formed in a generally L-shape in cross section by a top board 81 provided with two circular holes 81a in the vicinity of the ends in the longitudinal direction and a side board 82 extending downward from one side end portion of the top board 81. Both circular holes 81a serve in the same manner as the both circular holes 51a described in the First Embodiment above.

In the center in the longitudinal direction of the other side end portion of the top board 81, an engaging piece 81b extending in substantially parallel with the side board 82 is formed. In the center of the engaging piece 81b, an opening 81c is formed. At the end of the one side of the top board 81 in the longitudinal direction (the counter operation lever side), a hook engaging part 81d with which one side end portion 91 of the lock spring 90 can engage is formed.

On the side board 82, two support pieces 83 are provided. Each of the two support pieces 83 includes a support portion 83a having a generally C-shaped cross section which is connected to the side board 82 at the upper end and an extending portion 83b which extends in the downward slanting direction from the lower end of the support portion 83a. In the lower vicinity of the part of the side board 82 to which the both support portions 83a are connected, openings 82a which are wide open in the longitudinal direction are formed.

The pivoting member 80b includes a plate-like body 84 and a locking side engaging part 85 formed so as to project from one side in the longitudinal direction (counter operation lever side) of the plate-like body 84 in the crosswise and upward slanting direction. On the plate-like body 84, two elongated holes 84a, which are wide open in the longitudinal direction over the whole length in the longitudinal direction, are formed on the crosswise opposite side of the locking side engaging part 85 and are spaced from each other. Into each of the two elongated holes 84a, the extending portion 83b and the support portion 83a of the corresponding support piece 83 can be inserted. Each of the two elongated hole 84a is formed so that the width in the breadth direction is larger than the thickness of the support piece 83 so as to allow relative pivoting of the support piece 83 in an inserted state. The width in the longitudinal direction of the both elongated hole 84a is made larger than that of the support piece 83 so that the support piece 83 in an inserted state can slide in the longitudinal direction.

On the locking side engaging part 85, four locking holes 85*a* are formed, which can engage with the notches 22*a*, 23*a* of the upper rail 20 and the corresponding notches 35*a* of the lower rail 30. The locking holes 85*a* have the same functions as the lock nails 55 described in the First Embodiment above. Different from the lock nails 55 of the above First Embodiment, the locking side engaging part 85 is configured so as to engage with the notches 22*a* on the side walls 22 positioned on the left as seen from the operation lever side.

On the plate-like body 84, protrusions 84*b* which project anglewise in the direction distant from the locking side engaging part 85 are formed in the vicinity of the both elongated holes 84*a*. The both protrusions 84*b* can be inserted into the corresponding openings 82*a*. The width in the longitudinal direction of the protrusion 84*b* is smaller than the width in the longitudinal direction of the opening 82*a* so that the protrusion 84*b* can slide in the longitudinal direction relative to the opening 82*a* when being inserted in the opening 82*a*.

Between the both protrusions 84*b*, a protrusion 84*c* projecting from the plate-like body 84 is formed in the same way. The protrusion 84*c* can be inserted in the opening 82*b* formed between the both openings 82*a* of the side board 82. The width of the protrusion 84*c* in the longitudinal direction is smaller than the width in the longitudinal direction of the opening 82*b* so that the protrusion 84*c* can slide in the longitudinal direction relative to the opening 82*b* when being inserted in the opening 82*b*.

The side (locking side engaging part side) distant from the elongated hole 84*a* on the other side (operation lever side) portion in the longitudinal direction of the plate-like body 84 is formed as a tilted portion 86 which is inclined upward. On the plate-like body 84 in the vicinity of the tilted portion 86, a through hole 86*a* is provided, with which the other side end portion 92 of the lock spring 90 can engage. As is the case with the tilted portion 56 described in the above First Embodiment, the tilted portion 86 is a part which is biased by the connecting piece 64*c* of the biasing member 60 in response to the operation of the operation lever 70.

On the side end portion of the lock engaging part in the center of the plate-like body 84 in the longitudinal direction, a latch part 87 which can be latched to the opening 81*c* of the lock bracket 80*a* is formed.

In the lock member 80 configured in this way, the lock bracket 80*a*, the pivoting member 80*b* and the lock spring 90 are assembled as described below.

First, the corresponding support pieces 83 are inserted in the both elongated holes 84*a*, and the both protrusions 84*b* and the protrusions 84*c* are inserted in the corresponding both openings 82*a* and the opening 82*b*. At this time, the other side end portion 92 of the lock spring 90 is inserted in the through hole 86*a* for latching.

The pivoting member 80*b* with the lock spring 90 being latched to is slid relative to the lock bracket 80*a* so that the locking side engaging part 85 of the pivoting member 80*b* is spaced from the hook engaging part 81*d* of the lock bracket 80*a*. During sliding, one side end portion 91 of the lock spring 90 is engaged with the hook engaging part 81*d*. With this engagement, as is the case with the lock spring 57 of the above First Embodiment, the lock spring 90 biases the pivoting member 80*b* around the pivot center L in the lock pivoting direction relative to the lock bracket 80*a* so as to keep the locked state.

Thus, the lock member 80 shown in FIG. 10 is completed.

The lock member 80 assembled in such a manner is fixed to the upper rail 20 by crimping the both circular holes 81*a* of the top board 81*a* and the two circular holes 21*a* provided on the top wall 21 using a rivet 25, with the top board 81 and the side board 82 of the lock bracket 80*a* being in contact with the top wall 21 and the side board 22 of the upper rail 20.

At this time, to the lock member 80, the lock spring 90 which biases the pivoting member 80*b* in the lock pivoting direction has already been assembled. Therefore, the insertion work of the one side end portion 57*a* of the lock spring 57 into the through hole 56*a* of the lock member 50 fixed to the upper rail 20 is not required as described in the above First Embodiment, resulting in improvement in the workability for assembling and reduction of the manufacturing cost.

In the seat sliding device 10 having the lock member 80 with above configuration fixed to the upper rail, when the gripper 71 of the operation lever 70 is not operated, the lock member 80 is biased in the lock pivoting direction around the pivot center L by the biasing force of the lock spring 90 and each lock holes 85*a* of the locking side engaging part 85 are kept engaged with four notches among the notches 22*a*, 23*a* of the upper rail 20 and the notches 35*a* of the lower rail 30. As a result, the upper rail 20 and the lower rail 30 are locked so as not to make a relative movement.

In such a locked state by the lock member 80, when the gripper 71 of the operation lever 70 is operated to move upward, the support portion 73 of the operation lever 70 and the connecting body bracket 63 tilt, and the tilted portion 86 of the lock member 80 is downwardly biased by the connecting piece 64*c* of the connecting body 64. As a result, the pivoting member 80*b* pivots around the pivot center L and the engagement of the locking holes 85*a* and the notches 22*a*, 23*a* of the upper rail 20 and the notches 35*a* of the lower rail 30 is released, so that the upper rail 20 and the lower rail 30 become in an unlocked state allowing a relative movement. In an unlocked state, the latch part 87 of the pivoting member 80*b* is latched to the openings 81*c* of the lock bracket 80*a*, thereby preventing an excessive tension or the like from acting on the lock spring 90 by pivoting of the pivoting member 80*b*.

As explained above, in the seat sliding device 10 according to the Second Embodiment, the lock member 80 is provided with the lock spring 90 which biases the pivoting member 80*b* relative to the lock bracket 80*a* in the lock pivoting direction so as to keep a locked state.

Works such as engagement of the biasing member such as the lock spring with the lock member 80 fixed to the upper rail 20 are not required, resulting in improvement of the workability for assembling and reduction of manufacturing cost.

The present invention is not limited to the above embodiments, and it may be embodied as described below. Even in the cases below, the same actions or effects as the above embodiments are obtained.

(1) The pivoting member 50*b* of the lock member 50 is not limited to being pivotably supported to the lock bracket 50*a* around the pivot center L by inserting the support pieces 53 in the elongated holes 54*a* for engagement, and it may be pivotably supported to the lock bracket 50*a* so that the pivot center L is separated from the lock nails 55.

(2) Three support pieces 53 and three elongated holes 54*a* are provided. However, the number is not limited to three and one or two, otherwise four or more support pieces 53 and elongated holes 54*a* may be provided.

(3) The support portion 53*a* is formed in a generally C-shape in cross section. However, the shape is not limited to that and the support portion 53*a* may be formed in a shape in which the elongated hole 54*a* inserted with the support portion 53*a* has such a shape that the support portion 53*a* cannot easily come off from the elongated hole 54*a*.

(4) Three protrusions 54*b* and three openings 52*a* are provided. However, the number is not limited to three and one or two, otherwise four or more protrusions 54*b* and openings 52*a* may be provided.

(5) The connecting body bracket 63 of the biasing member 60 and the connecting body 64 may not be separate bodies, and the connecting body bracket 63 and the connecting body 64 may be formed integrally.

(6) In the above First Embodiment, the lock spring 57 may not be used and the biasing member for locking may be provided, which biases the pivoting member 50*b* of the lock member 50 relative to the lock bracket 50*a* around the pivot center L in the lock pivoting direction. As a result, as is the case with the above Second Embodiment, the workability for assembling of the lock member 50 is improved and the manufacturing cost is reduced.

DESCRIPTION OF REFERENCE NUMERALS

10 Seat sliding device
20 Upper rail (upper rail member)
22*a*, 23*a* Notches (engaged parts on the upper rail side)
30 Lower rail (lower rail member)
35*a* Notch (engaged part on the lower rail side)
50 Lock member
50*a* Lock bracket (support member)
50*b* Pivoting member
52*a* Opening
53 Support piece
53*a* Support portion
54*a* Elongated hole (through hole)
54*b* Protrusion
55 Locking nail (locking side engaging part)
56 Tilted portion
56*a* Through hole
60 Biasing member
61 Connecting body support member
62 Shaft
63 Connecting body bracket
63*b* Through hole
64 Connecting body
64*c* Connecting piece
70 Operation lever (operation member)
71 Gripper
72 Connecting portion
73 Support body
73*a* Through hole
80 Lock member
80*a* Lock bracket (support member)
80*b* Pivoting member
81*c* Hook engaging part
82*a*, 82*b* Openings
83 Support piece
83*a* Support portion
84*a* Elongated hole (through hole)
84*b*, 84*c* Protrusions
85 Locking side engaging part
86 Tilted portion
86*a* Through hole
90 Lock spring (biasing member for locking)
B Vehicle floor (vehicle body)
L Pivot center
S Vehicle seat

The invention claimed is:

1. A seat sliding device comprising:
a lower rail member fixable to a vehicle body;
an upper rail member fixable to a seat and provided slidably to the lower rail member;
a lock member having a locking side engaging part which can engage with or disengage from an engaged part on the lower rail side of the lower rail member and an engaged part on the upper rail side of the upper rail member; and
an operation member which is operated to switch between a locked state in which the locking side engaging part engages with the engaging part on the lower rail side and the engaging part on the upper rail side and an unlocked state in which the locked state is released,
the lock member pivots around a pivot center extending in the sliding direction, in response to the operation of the operation member and that the pivot center is located at a position spaced from the locking side engaging part, the lock member includes a pivoting member having the locking side engaging part formed at a position distant from the pivot center, and
a support member which pivotably supports the pivoting member around the pivot center,
the pivoting member includes one or a plurality of through holes formed at positions distant from the locking side engaging part, and the support member includes support pieces, which can be inserted into the through holes and pivot relative to the through holes in an inserted state, formed by the same number as that of the through holes,
each of the support pieces includes a support portion having a C-shaped cross section and is inserted into the through hole so as to allow a relative pivot at the support portion,
the pivoting member includes one or a plurality of protrusions projecting from a part distant from the locking side engaging part to the direction distant from the locking side engaging part,
the support member includes openings formed with the same number as that of protrusions, through which the protrusions can be inserted when the support pieces are inserted into the through holes and which are open slightly wider than the protrusions, and
the operation member presses to move a part distant from the pivot center of the pivoting member when switching to the unlocked state.

2. The seat sliding device according to claim 1, wherein the lock member includes a biasing member for locking which biases the pivoting member relative to the support member so as to keep it in the locked state.

* * * * *

UNITED STATES PATENT AND TRADEMARK OFFICE
CERTIFICATE OF CORRECTION

PATENT NO.        : 8,398,043 B2                                           Page 1 of 1
APPLICATION NO. : 12/992823
DATED             : March 19, 2013
INVENTOR(S)       : Kimura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this

First Day of September, 2015

Michelle K. Lee
*Director of the United States Patent and Trademark Office*